United States Patent
Sakurai et al.

(10) Patent No.: US 8,923,691 B2
(45) Date of Patent: Dec. 30, 2014

(54) SHAKE CORRECTING DEVICE AND IMAGING APPARATUS HAVING SHAKE CORRECTING DEVICE

(71) Applicant: Panasonic Corporation, Osaka (JP)

(72) Inventors: Mikio Sakurai, Osaka (JP); Hiroyuki Kojima, Osaka (JP); Tetsuhiro Yamada, Kyoto (JP); Naoko Takeda, Osaka (JP)

(73) Assignee: Panasonic Corporation, Osaka (JP)

( * ) Notice: Subject to any disclaimer, the term of this patent is extended or adjusted under 35 U.S.C. 154(b) by 67 days.

(21) Appl. No.: 13/751,214

(22) Filed: Jan. 28, 2013

(65) Prior Publication Data

US 2013/0195434 A1 Aug. 1, 2013

(30) Foreign Application Priority Data

Jan. 30, 2012 (JP) .................................. 2012-016644

(51) Int. Cl.
- G03B 15/00 (2006.01)
- G03B 17/00 (2006.01)
- G02B 27/64 (2006.01)
- H04N 5/232 (2006.01)

(52) U.S. Cl.
CPC .............. *G02B 27/64* (2013.01); *G02B 27/646* (2013.01); *H04N 5/23261* (2013.01); *G03B 2217/005* (2013.01)
USPC .......................................... 396/55; 348/208.3

(58) Field of Classification Search
USPC .................................... 396/52–55; 348/208.3
See application file for complete search history.

(56) References Cited

U.S. PATENT DOCUMENTS

| | | | |
|---|---|---|---|
| 5,761,545 A * | 6/1998 | Tanaka et al. | 396/53 |
| 7,483,055 B2 * | 1/2009 | Moriya | 348/208.3 |
| 7,787,018 B2 * | 8/2010 | Hatanaka et al. | 348/208.2 |
| 7,840,126 B2 * | 11/2010 | Fushida et al. | 396/53 |
| 8,488,955 B2 * | 7/2013 | Yamazaki | 396/55 |
| 2005/0128309 A1 * | 6/2005 | Tomita et al. | 348/208.7 |
| 2011/0013031 A1 * | 1/2011 | Miyasako | 348/208.99 |

FOREIGN PATENT DOCUMENTS

| | | |
|---|---|---|
| JP | 7-288734 | 10/1995 |
| JP | 2002-99013 | 4/2002 |
| JP | 2005-202018 | 7/2005 |
| JP | 2006-98655 | 4/2006 |
| JP | 2010-191236 | 9/2010 |

* cited by examiner

*Primary Examiner* — Clayton E LaBalle
*Assistant Examiner* — Leon W Rhodes, Jr.

(57) ABSTRACT

A shake correcting device can correct a shake occurring on a target device. The shake correcting device includes an angular velocity detector, a DC component detector, a controller, a panning detector, and a storage unit. When the panning detector changes from a state in which the panning is detected to a state in which the panning is not detected, the controller controls the DC component detector to output the value of a DC component of angular velocity of the target device stored in the storage unit when the panning detector does not detect panning, and then controls the DC component detector to output a DC component based on angular velocity of the target device detected by the angular velocity detector.

7 Claims, 5 Drawing Sheets

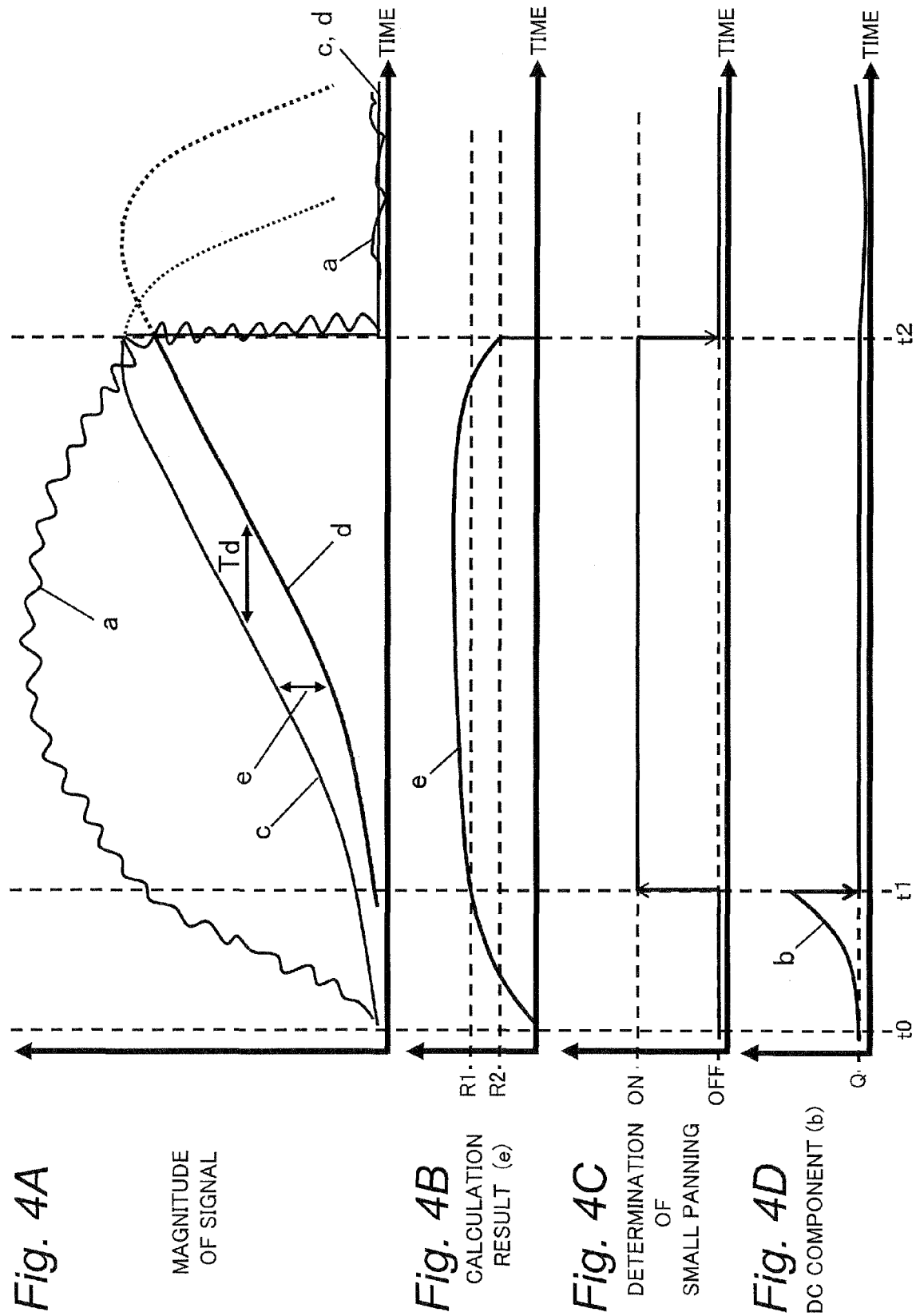

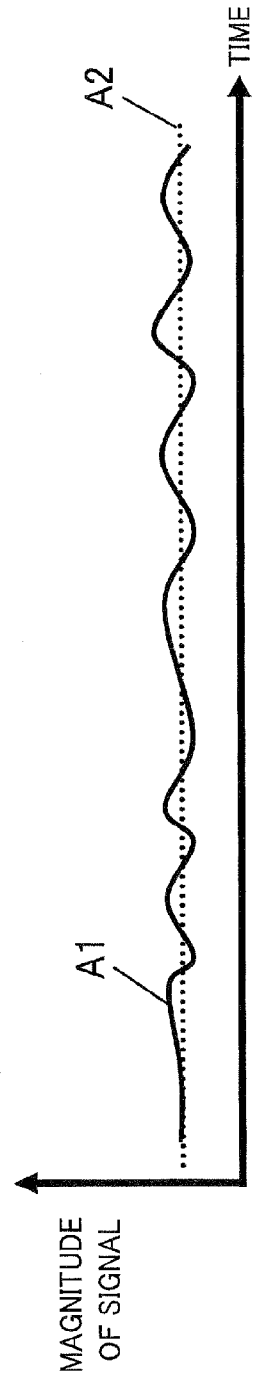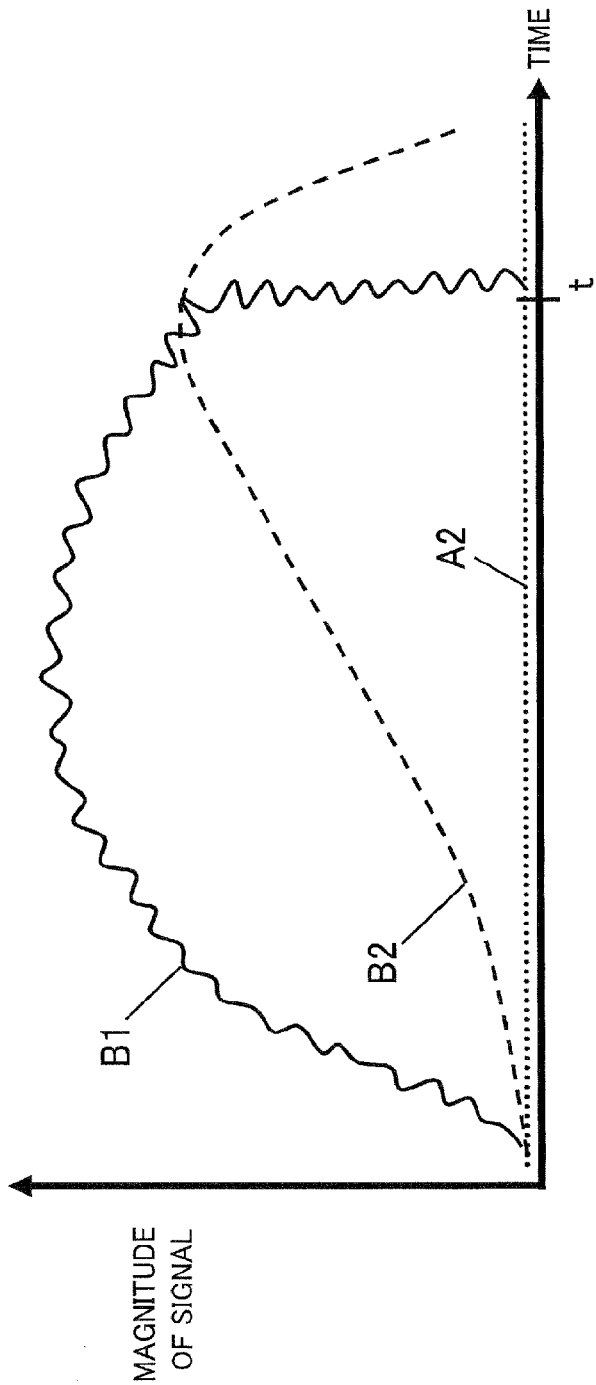

SHAKE CORRECTING DEVICE AND IMAGING APPARATUS HAVING SHAKE CORRECTING DEVICE

BACKGROUND

1. Technical Field

The present disclosure relates to a panning determination device for determining panning, a shake correcting device that includes the panning determination device and corrects a shake, and an imaging apparatus including the shake correcting device or the panning determination device.

2. Related Art

Conventionally, an imaging apparatus is mounted with detecting means (gyro sensor or the like) for detecting a shake of the apparatus. The detecting means detects oscillation of a frequency band of about 1 to 10 Hz caused by a photographer's camera shake, and the imaging apparatus performs various controls such as camera shake correction based on detection result.

JP2006-98655A discloses an imaging apparatus for determining panning based on outputs from an angular velocity sensor.

Conventional imaging apparatuses can detect panning with a predetermined angular velocity or more. However, it is difficult for the conventional imaging apparatuses to detect panning with slow angular velocity that is not more than the predetermined angular velocity. For this reason, even when a user intends to operate for panning, the panning is not detected, and thus the camera shake correction occasionally fails.

The present disclosure provides a device capable of repressing a deterioration in accuracy of the shake correction caused by the panning.

SUMMARY

A shake correcting device according to the present disclosure is operable to correct a shake occurring on a target device. The shake correcting device includes a driver operable to drive a target member configured to correct the shake occurring on the target device, an angular velocity detector operable to detect an angular velocity of the target device, a DC component detector operable to detect a direct current component from the angular velocity detected by the angular velocity detector to output the DC component, a shake corrector operable to control the driver based on the angular velocity detected by the angular velocity detector, using an output from the DC component detector as a reference value, a controller operable to control the DC component detector and the shake corrector based on the angular velocity detected by the angular velocity detector, a panning detector operable to detect panning of the target device based on the angular velocity detected by the angular velocity detector, and a storage unit operable to store a value of the DC component output from the DC component detector when the panning detector does not detect panning. When the panning detector changes from a state in which the panning is detected to a state in which the panning is not detected, the controller controls the DC component detector to output the value of the DC component stored in the storage unit and then controls the DC component detector to output the DC component based on the angular velocity detected by the angular velocity detector.

Further, a panning determination device according to the present disclosure includes an angular velocity detector operable to detect an angular velocity of a target device, a calculator operable to calculate a temporal variation in a DC component included in the detected angular velocity, and a panning determiner operable to determine whether the target device is panned based on the temporal variation calculated by the calculator. The panning determiner determines that the target device is panned when the calculated temporal variation is within a predetermined range.

Further, an imaging apparatus according to the present disclosure includes the shake correcting device or the panning determination device.

The devices according to the present disclosure can repress a deterioration in the accuracy of the shake correction caused by panning.

BRIEF DESCRIPTION OF DRAWINGS

FIGS. 4A to 4D are charts for describing operations of the shake processor according to the present embodiment during small panning;

FIG. 5A is a chart for describing general camera shake correction; and

FIG. 5B is a chart for describing a problem of the camera shake correction in a conventional camera.

DETAILED DESCRIPTION OF PREFERRED EMBODIMENTS

Figure 1:
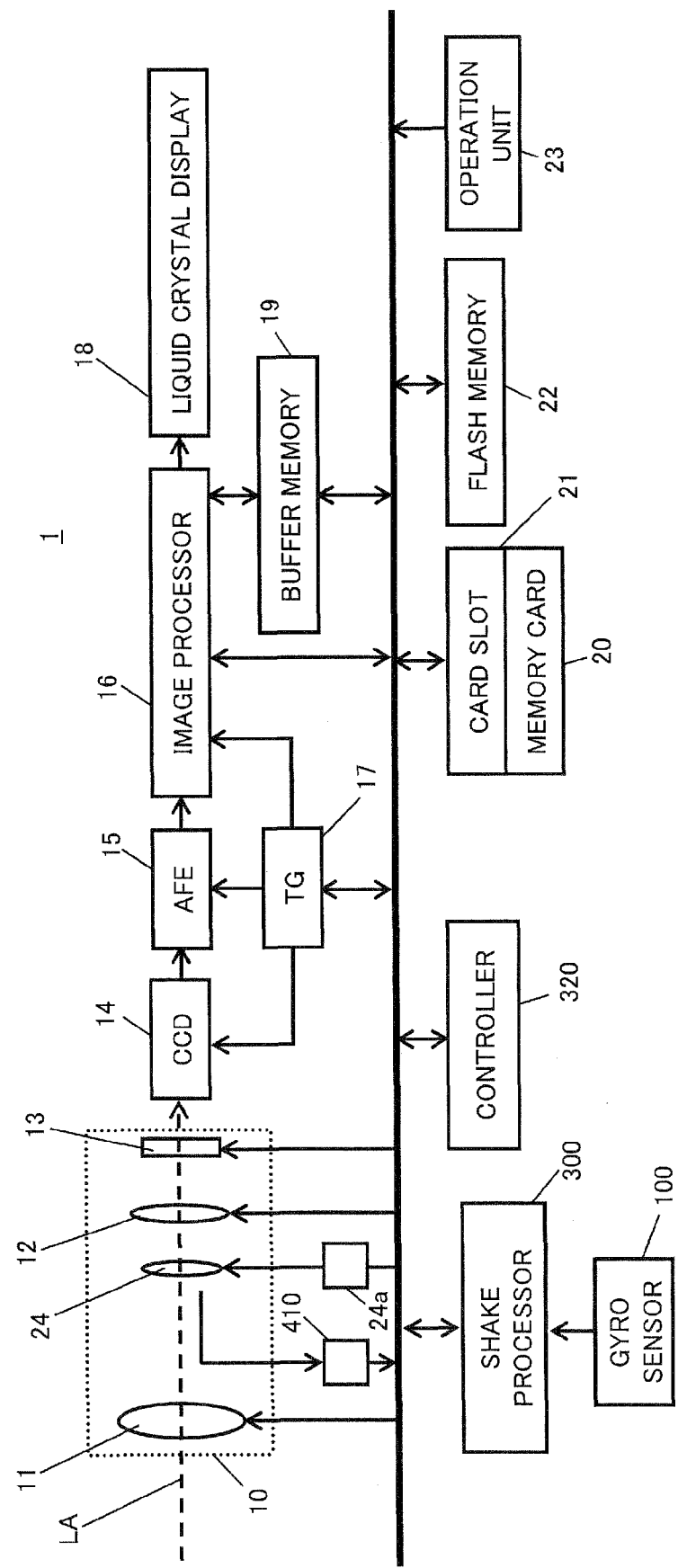
FIG. 1 is a block diagram illustrating a configuration of a camera according to the present embodiment.

An embodiments according to the present disclosure will be described below suitably with reference to the drawings. Note that a camera (a digital camera) is used as the embodiment.

In the description of the present disclosure, certain unnecessary portions regarding, for example, conventional technology, redundant description of substantially the same configuration may be omitted for ease of description.

The following description and the attached drawings are disclosed to enable those skilled in the art to sufficiently understand the present disclosure, and are not intended to limit the subject matter of the claims.

1. Problem of Conventional Camera Shake Correction

Before describing the present embodiment, a problem of the camera shake correction in a conventional camera will be described in more detail. As an example, a camera is described. FIG. 5A is a diagram illustrating a temporal variation in an angular velocity detected by an angular velocity detecting means, and a temporal variation in a direct current component extracted from the detected angular velocity. FIG. 5B is a diagram illustrating a temporal variation in the angular velocity detected by the angular velocity detecting means, and a temporal variation in the direct current component extracted from the detected angular velocity during a panning operation with a comparatively low speed. Time t indicates time at which the panning ends.

A camera detects an angular velocity of a shake of the camera caused by camera shake or the like, and corrects the camera shake based on the detected angular velocity. Specifically, to begin with, the angular velocity detecting means such as a gyro sensor detects an angular velocity A1 of the camera. The camera extracts a direct current component A2 from the detected angular velocity A1. Then camera corrects the camera shake using the extracted direct current component A2 as a reference value of the angular velocity A1. The use of the extracted direct current component A2 as the reference value enables a drift component included in the angular velocity A1 detected by the angular velocity detecting means to be excluded.

When the camera that performs such camera shake correction is panned with a comparatively low speed, as shown in FIG. 5B, an angular velocity B1 detected by the angular velocity detecting means changes. Further, a reference value B2 as the direct current component of the angular velocity B1 changes according to a change in the angular velocity B1. That is to say, the reference value B2 of the camera shake correction shifts in comparison with the reference value A2 extracted when the panning operation is not performed. Since the reference value B2 shifts, the reference value B2 that is larger than the reference value A2 to be originally subtracted is subtracted from the angular velocity B1. For this reason, a value of the angular velocity to be used for the correction is smaller than an original value, thus accuracy of the camera shake correction deteriorates.

Further, since the reference value B2 is extracted from the angular velocity B1 of the camera, the temporal variation in the reference value B2 delays from the temporal variation in the angular velocity B1. Consequently, even after the panning ends (time t), the reference value B2 continues to shift for some length of time. Therefore, conventional cameras have a problem such that the accuracy of the camera shake correction deteriorates after the panning ends.

A shake correction device according to the present disclosure represses the deterioration in the accuracy of the camera shake correction caused by the panning.

2. Outline of Camera According to Embodiment

The camera according to the present embodiment has a shake detecting function for detecting shake of a camera itself. The camera determines the panning operation performed with the low angular velocity by the user, based on a difference between an output signal from a second direct current component detecting unit on a basis of an output signal from a gyro sensor and an output signal from a time delaying unit on a basis of the output result of the second direct current component detecting unit. Then, camera corrects the camera shake based on the determination on the panning operation. A configuration and operations of the camera according to the present embodiment will be described in detail below.

2-1. Configuration of Camera

FIG. 1 is a block diagram illustrating an electrical configuration of the camera according to the present embodiment.

The camera 1 includes an optical system 10, a CCD image sensor 14, an analog front end (AFE) 15, an image processor 16, a timing generator (TG) 17, a liquid crystal display 18, a buffer memory 19, a card slot 21 into which a memory card 20 can be inserted, a flash memory 22, an operation unit 23, a correction lens driver 24a, a gyro sensor 100, a shake processor 300, a controller 320, and a lens position detector 410.

The optical system 10 includes a focus lens 11, a zoom lens 12, a diaphragm 13, and a camera shake correction lens 24.

The camera 1 captures a subject image formed by light incident through the optical system 10 using the CCD image sensor 14. Image data generated by the capturing is subject to predetermined processes in the AFE 15 and the image processor 16. The image data is recorded in the flash memory 22 and/or the memory card 20. The image data recorded in the flash memory 22 and/or the memory card 20 is displayed on the liquid crystal display 18 according to a user's operation to the operation unit 23. Further, the camera 1 detects shake of the camera 1 via the gyro sensor 100, to drive the camera shake correction lens 24 so that an influence of the shake upon an image to be captured is reduced.

The focus lens 11 adjusts a focal length. The zoom lens 12 adjusts zoom-in/zoom-out magnification. The diaphragm 13 adjusts an amount of light incident on the CCD image sensor 14. The focus lens 11, the zoom lens 12 and the diaphragm 13 are controlled by the controller 320 via corresponding drivers.

The lens position detector 410 detects a current position of the correction lens 24 to notify the shake processor 300 of the detection result.

The correction lens driver 24a drives the camera shake correction lens 24 under the control of the controller 320. Specifically, the correction lens driver 24a drives the camera shake correction lens 24 according to a camera shake signal output from the gyro sensor 100 so that the camera shake correction lens 24 moves on a plane perpendicular to an optical axis LA. Thereby, the optical axis LA of the optical system 10 is corrected according to the camera shake signal.

Note that the respective lenses of the optical system 10 may be composed of any number of lenses or any number of lens groups.

The CCD image sensor 14 converts light condensed via the optical system 10 into an electric signal. On a light receiving surface of the CCD image sensor 14, a number of photodiodes are arranged two-dimensionally. The light from the subject passing through the optical system 10 is imaged on the light receiving surface of the CCD image sensor 14. Then, on the light receiving surfaces, the light from the subject is converted into electric charges by applying a photoelectric effect, and the electric charges are accumulated. The electric charges accumulated on the respective light receiving surfaces are transferred to an amplifying circuit by a vertical CCD and a horizontal CCD. The amplifying circuit generates an image signal according to the amount of the transferred electric charges. Note that the CCD image sensor 14 is used in the present embodiment, but instead of the CCD image sensor 14, for example, another imaging device such as a CMOS image sensor or a NMOS image sensor may be used.

The above exemplifies a case in which the camera shake is corrected by driving the camera shake correction lens 24, but the idea of the embodiment is not limited to this. That is to say, the camera shake may be corrected by driving the CCD image sensor 14 on the plane perpendicular to the optical axis LA.

The AFE 15 carries out correlated double sampling, gain adjustment, and conversion from an analog image data into digital image data on the image signal generated by the CCD image sensor 14. Thereafter, the AFE 15 outputs the image data of an RGB signal to the image processor 16.

The image processor 16 executes various processes on the image data. The various processes include at least one of gamma correction, white balance correction, a YC converting process, an electronic zoom process, a compressing process, decompressing process, and the like. Further, the various processes may include another process. The image processor 16 may be composed of a hard-wired electronic circuit a microcomputer with a program, or the like. Further, the image processor 16 as well as the controller 320 or the like may be composed of one semiconductor chip.

The liquid crystal display 18 displays an image based on image data for display processed by the image processor 16. Further, the liquid crystal display 18 can display information such as setting conditions of the camera 1 besides the image. Note that the display is not limited to a liquid crystal type, a plasma type and an organic EL type, and various display devices can be used as long as they display images.

The controller 320 controls an entire operation of the camera 1. The controller 320 may be composed of a hard-wired electronic circuit, a microcomputer with a program, or the like. Also, the controller 320 as well as the image processor 16 or the like may be composed of one semiconductor chip. Also, the controller 320 may include an internal memory.

The controller 320 periodically generates a vertical synchronizing signal to output the vertical synchronizing signal to a TG 17. The TG 17 generates, based on the vertical synchronizing signal, a synchronizing signal for driving the CCD image sensor 14, the AFE 15, the image processor 16, a shutter (not shown), and various motors (not shown).

The buffer memory 19 is a storage means that functions as a work memory for the image processor 16 and the controller 320. The buffer memory 19 can be implemented with a DRAM (Dynamic Random Access Memory) or the like.

The flash memory 22 functions as an internal memory for storing image data or the like. The controller 320 stores image data processed by the image processor 16 in the flash memory 22 or in the memory card 20.

The memory card 20 can be inserted into the card slot 21 so that the card slot 21 can be electrically and mechanically connected with the memory card 20. The card slot 21 may have a function for controlling the memory card 20.

The memory card 20 is an external memory incorporating a storage unit such as the flash memory. The memory card 20 can store data such as image data to be processed by the image processor 16. In the present embodiment, the memory card 20 is described as one example of an external memory, but the external memory is not limited to this. For example, a storage medium such as an optical disc may be used as the external memory.

The operation unit 23 includes operation members for receiving user's operations. The operation members include a button, a sliding-type switch, a touch panel, and/or the like which are provided to an exterior of the camera 1.

The gyro sensor 100 detects a shake (oscillation) in a yawing direction and a shake in a pitching direction based on an angle change of the camera 1 per unit time, namely, the angular velocity of the camera 1. Hereinafter, a gyro signal as a signal output from the gyro sensor 100 is "an angular velocity signal". The gyro sensor 100 outputs the angular velocity signal indicating an amount of detected shake (the angular velocity) to the shake processor 300. The angular velocity signal output from the gyro sensor 100 sometimes includes wide frequency components caused by a camera shake, a machine noise, and/or the like. The gyro sensor 100 according to the present embodiment is a digital gyro sensor outputting a signal in digital form. Note that, in the present embodiment, the gyro sensor 100 is used as an angular velocity detecting means, but another sensor can be used as long as they can detect the shake of the camera 1 instead of the gyro sensor 100. A configuration of the gyro sensor 100 will be described later.

The shake processor 300 executes various processes, described later, on the input gyro signals. The shake processor 300 as well as the controller 320 and the gyro sensor 100 compose a shake detecting device according to the present embodiment. The shake detecting device executes a calculating process, described later, based on the angular velocity signal from the gyro sensor 100, and outputs a lens control signal for making the camera shake correction lens 24 correct the optical axis LA, to the correction lens driver 24a. The shake detecting device as well as the camera shake correction lens 24 and the correction lens driver 24a compose the shake correction device according to the embodiment.

2-2. Configuration of Gyro Sensor

Figure 2:
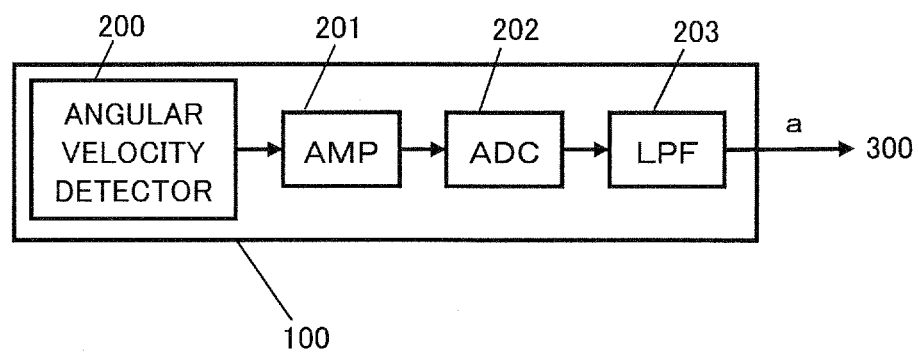
FIG. 2 is a block diagram illustrating a configuration of a gyro sensor according to the present embodiment.

The configuration of the gyro sensor 100 according to the present embodiment will be described with reference to FIG. 2. The gyro sensor 100 includes an angular velocity detector 200, an AMP (amplifier) 201, an ADC (analog/digital converter) 202, an LPF (low-pass filter) 203.

The angular velocity detector 200 includes a detecting element for detecting angular velocity of the camera 1 in the pitching direction and the yawing direction. An analog signal indicating the angular velocity in the pitching direction and the yawing direction detected by the angular velocity detector 200 is transmitted to the AMP 201.

The AMP 201 amplifies the analog signal output from the angular velocity detector 200 to transmit the analog signal to the ADC 202.

The ADC 202 converts the analog angular velocity signal amplified by the AMP 201 into a digital angular velocity signal. The digitally-converted angular velocity signal is transmitted to the LPF 203.

The LPF 203 cuts off high frequency components of the angular velocity signal transmitted from the ADC 202 to extract only camera shake by a photographer because the frequency of the camera shake by photographer is a low frequency of about 1 to 10 Hz. When a noise is not a problem, the LPF 203 can be omitted.

The signal output from the LPF 203 is transmitted as the angular velocity signal (a) to the shake processor 300.

2-3. Configuration of Shake Processor

A configuration of the shake processor 300 according to the present embodiment will be described with reference to FIG. 3. The shake processor 300 according to the present embodiment includes a first direct current component detector 301, a second direct current component detector 302, a time delaying unit 303, a shake controller 305, a phase compensator 306, an integrator 307, a HPF (high-pass filter) 308, a first adder 309, a second adder 310, and a PID controller 400.

The shake controller 305 includes a small panning determiner 304a and a large panning determiner 304b.

The first direct current component detector 301 includes a storage unit 301a.

The shake processor 300 and the gyro sensor 100 are connected with each other through a digital interface so that bidirectional communication of digital signals is enabled between the shake processor 300 and the gyro sensor 100.

The angular velocity signal (a) transmitted from the gyro sensor 100 to the shake processor 300 is transmitted to the first direct current component detector 301, the second direct current component detector 302, and the first adder 309.

The first direct current component detector 301 can detect a DC component of the input angular velocity signal (a). The detected DC component is used as a reference value of the angular velocity signal (a) in the camera shake correction. The first direct current component detector 301 is implemented with an IIR (Infinite Impulse Response) filter, an FIR (Finite Impulse Response) filter, or the like. In the present embodiment, the IIR filter is used as the first direct current component detector 301.

The first direct current component detector 301 retains a value of the DC component detected from the input angular velocity signal (a) in the storage unit 301a. For example, the first direct current component detector 301 retains a value of DC component detected at a past time point at which a predetermined condition is satisfied, in the storage unit 301a. Specifically, the first direct current component detector 301 retains a value of a DC component (b) at a time when neither the small panning determiner 304a nor the large panning determiner 304b detects panning, in the storage unit 301a. The panning determination by means of the small panning determiner 304a and the large panning determiner 304b will be described later. Note that the storage unit 301a may be provided inside the first direct current component detector 301 or outside the first direct current component detector 301.

Further, the first direct current component detector 301 is connected with the shake controller 305. Thereby, the shake controller 305 can control a signal output from the first direct current component detector 301. An output signal of the first direct current component detector 301 is used as a reference value in the camera shake correction. Concretely, the shake controller 305 controls the first direct current component detector 301 to transmit to the first adder 309 a value of the DC component of the currently detected angular velocity signal or a value of the DC component detected at a past time when a predetermined condition is satisfied. Hereinafter, a signal output from the first direct current component detector 301 to the first adder 309 is called a "DC component (b)".

The second direct current component detector 302 can detect the DC component of the input angular velocity signal (a). The second direct current component detector 302 is implemented with an IIR (Infinite Impulse Response) filter, an FIR (Finite Impulse Response) filter, or the like. The second direct current component detector 302 may be composed of a circuit having a different type from the first direct current component detector 301 according to design specifications.

The second direct current component detector 302 successively transmits the value of the DC component detected from the input angular velocity signal (a) to the time delaying unit 303 and the second adder 310. Hereinafter, a signal output from the second direct current component detector 302 is called a "DC component (c)".

Also, the second direct current component detector 302 is connected to the shake controller 305. Thereby, the shake controller 305 can control a signal output from the second direct current component detector 302.

The time delaying unit 303 is a circuit that performs a predetermined calculation on the DC component (c) input from the second direct current component detector 302 to generate a signal which has the same level as the DC component (c) and is delayed by predetermined time Td from DC component (c). The time delaying unit 303 may be implemented with an FIR filter. In another manner, the time delaying unit 303 may be configured to simply delay the DC component (c) input from the second direct current component detector 302 by predetermined time Td. Herein, the predetermined calculation may be any calculation as far as it includes at least a calculation generating a signal that follows the DC component (c) input from the second direct current component detector 302 and is delayed from the DC component (c) only by the predetermined time Td.

However, use of the FIR filter as the time delaying unit 303 can provide a signal with less noise influence. Hence, the use of the FIR filter is advantageous when an output signal from the time delaying unit 303 is used as a reference in the small panning determination (details will be described later).

Further, the time delaying unit 303 is connected to the shake controller 305. Thereby, the shake controller 305 can control a signal output from the time delaying unit 303. Hereinafter, a signal output from the time delaying unit 303 is called a "delay signal (d)". The time delaying unit 303 successively transmits the delay signal (d) delayed from the signal (c) input from the second direct current component detector 302 to the second adder 310.

The second adder 310 calculates an absolute value of a difference between the signal (c) transmitted from the second direct current component detector 302 and the delay signal (d) transmitted from the time delaying unit 303. Hereinafter, a signal output from the second adder 310 is called a "calculation result (e)". The second adder 310 transmits the calculation result (e) to the small panning determiner 304a and the large panning determiner 304b in the shake controller 305.

The small panning determiner 304a determines whether "small panning" is carried out in the camera 1 based on the calculation result (e) input from the second adder 310. "The small panning" is a panning carried out with a comparatively low angular velocity. Hereinafter, the panning operation that is performed with an angular velocity lower than a predetermined angular velocity is "small panning".

The small panning determiner 304a determines that the small panning is carried out in the camera 1, when, for example, the angular velocity which is not more than 30 deg/sec (the predetermined angular velocity) and not less than 3 deg/sec continues for 0.3 sec or more.

Note that the angular velocity of the panning carried out in the camera 1 can be calculated from the calculation result (e) based on cut-off frequencies set respectively in the first and second direct current component detectors 301 and 302, delay time in the time delaying unit 303, and the like. Hence, the calculation result (e) indicates a value corresponding to the angular velocity of the panning carried out in the camera 1.

More specifically, the small panning determiner 304a compares the calculation result (e) input from the second adder 310 with a predetermined threshold. Then, the small panning determiner 304a determines that the small panning starts when the calculation result (e) exceeds the predetermined threshold. During the small panning determination, when the calculation result (e) becomes smaller than the predetermined threshold, the small panning determiner 304a determines that the small panning ends.

Herein, the threshold for determining of the small panning is set to, for example, a value corresponding to the angular velocity of 3 deg/sec of the panning. Note that the threshold for determining the end of the small panning may be different from the threshold for determining start of the small panning. For example, the threshold for determining the end of the small panning may be smaller than the threshold for determining the start of the small panning.

The small panning determiner 304a successively transmits a determination result of the small panning to the shake controller 305. Thereby, the shake controller 305 can execute various controls according to the determination result of the small panning.

Figure 3:
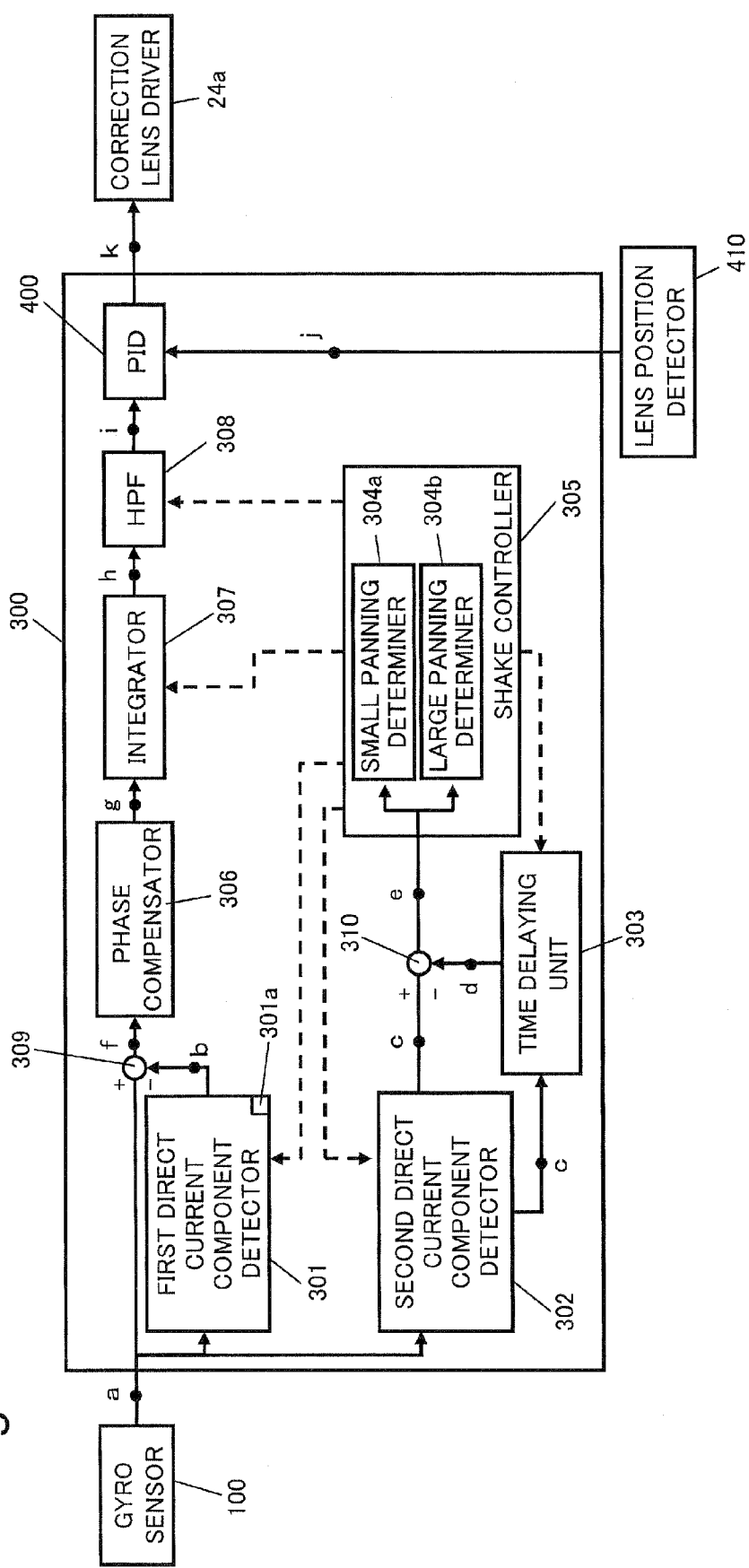
FIG. 3 is a block diagram illustrating a configuration of a shake processor according to the present embodiment.

Note that the example shown in FIG. 3 illustrates the configuration that the small panning determiner 304a is included in the shake controller 305, but the idea of the present embodiment is not limited to this. That is to say, the small panning determiner 304a and the shake controller 305 may be implemented individually. In this case, the small panning determiner 304a is configured to notify the shake controller 305 of the small panning determination result.

The shake controller 305 can control an output signal (b) of the first direct current component detector 301, an output signal (c) of the second direct current component detector 302, and an output signal (d) of the time delaying unit 303 according to the determination result of the small panning by the small panning determiner 304a. Also, the shake controller 305 is connected with the integrator 307 and the HPF 308. Thereby, the shake controller 305 can adjust a cut-off frequency in an integrating process of the integrator 307 and a cut-off frequency of the HPF 308 according to the determination result of the small panning by the small panning determiner 304a.

The first adder 309 subtracts the DC component (b), that is input from the first direct current component detector 301, from the angular velocity signal (a), that is input from the gyro sensor 100. That is to say, the first adder 309 corrects the angular velocity signal (a) with the DC component (b) being used as the reference value. As a result, the first adder 309 can extract a camera shake signal, from which an influence of drift caused by a temperature or the like included in an output signal from the gyro sensor 100 is removed, from the angular velocity signal (a). Hereinafter, the signal output from the first adder 309 is called a "camera shake signal (f)". The first adder 309 outputs the camera shake signal (f) into the phase compensator 306.

The phase compensator 306 corrects a phase lag of the input camera shake signal (f) caused by the correction lens driver 24a or the like. Hereinafter, the signal output from the phase compensator 306 is called a "correction signal (g)". The phase compensator 306 outputs the correction signal (g) into the integrator 307.

The integrator 307 integrates the correction signal (g) as a signal indicating the angular velocity of shake (oscillation) input from the phase compensator 306 to generate a signal indicating an angle of the shake (oscillation). Hereinafter, the signal generated by the integrator 307 is called a "lens control signal (h)". The integrator 307 outputs the lens control signal (h) into the HPF 308.

The HPF 308 cuts off low frequency components included in the lens control signal (h) input from the integrator 307. Thereby, a drift component included in the lens control signal (h) can be cut off. Hereinafter, the signal of which low frequency components of the lens control signal (h) are cut off by the HPF 308 is called a "lens control signal (i)". The HPF 308 outputs the lens control signal (i) to the PID controller 400.

The PID controller 400 performs PID control to generate a control signal based on a difference between the input lens control signal (i) and current position information (j) of the camera shake correction lens 24 notified by the lens position detector 410. Hereinafter, the signal generated by the PID controller 400 is called a "PID control signal (k)". The PID controller 400 transmits the PID control signal (k) to the correction lens driver 24a.

The correction lens driver 24a drives the camera shake correction lens 24 based on the PID control signal (k).

The large panning determiner 304b determines whether "large panning" is carried out in the camera 1 based on the calculation result (e) input from the second adder 310. The "large panning" is panning with a comparatively high angular velocity. Hereinafter, the panning operation that is performed with an angular velocity higher than the predetermined angular velocity is called "large panning".

Note that, when the small panning determiner 304a does not determine the small panning and the large panning determiner 304b does not determine the large panning, the shake controller 305 does not change the output signal from the first direct current component detector 301, the cut-off frequency of the integrator 307, and the cut-off frequency of the HPF 308. That is to say, with the first direct current component detector 301, the integrator 307, and the HPF 308 operating at predetermined setting, the shake processor 300 corrects a camera shake. Hereinafter, such camera shake correction performed at time other than the small panning determination and the large panning determination is called "regular camera shake correction".

2-4. Operation of Shake Processor

An operation of the shake processor 300 according to the present embodiment will be described. The shake processor 300 switches the control according to a level of the calculation result (e) of the second adder 310. The shake processor 300 detects presence/absence of the panning based on the calculation result (e). When not detecting the panning, the shake processor 300 performs the regular camera shake correction. On the other hand, while the small panning determiner 304a is detecting the small panning, the shake controller 305 performs the dedicated control upon the detection of the small panning. While the large panning determiner 304b is detecting the large panning, the shake controller 305 performs the dedicated control upon the detection of the large panning. Hereinafter, the operations of the shake processor 300 in respective cases will be described.

2-4-1. Operation of Shake Processor when Panning is not Detected

When the small panning determiner 304a detects no small panning and the large panning determiner 304a detects no large panning, the shake processor 300 controls the first direct current component detector 301 to output to the first adder 309 the DC component (b) currently extracted from angular velocity signal (a) by the first direct current component detector 301. Also, at this time, the shake processor 300 sets the cut-off frequency of the integrator 307 and the cut-off frequency of the HPF 308 to preset values for the regular camera shake correction.

The regular camera shake correction is performed as follows. The gyro sensor 100 detects a shake of the camera 1 to generate the angular velocity signal (a). The first direct current component detector 301 detects the DC component (b) of the angular velocity signal (a). The first adder 309 subtracts the DC component (b) from the angular velocity signal (a) to generate the camera shake signal (f). The phase compensator 306 corrects a phase lag of the camera shake signal (f) to generate a correction signal (g). The integrator 307 integrates the correction signal (g) to generate the lens control signal (h). The HPF 308 cuts off the low frequency components of the lens control signal (h) to generate the lens control signal (i). The PID controller 400 performs the PID control based on the difference between the lens control signal (i) and the current position information (j) of the camera shake correction lens 24 notified by the lens position detector 410, to generate a PID control signal (k). Then, the correction lens driver 24a drives the camera shake correction lens 24 based on the PID control signal (k). With the above operations of the respective units, the shake processor 300 performs the regular camera shake correction.

Further, during the regular camera shake correction, the first direct current component detector 301 stores the value of the DC component (b) extracted from the angular velocity signal (a) in the storage unit 301a.

2-4-2. Operation of Shake Processor during Small Panning

Referring to FIG. 4, an operation of the shake processor 300 according to the present embodiment performed when the small panning is carried out on the camera 1 will be described. FIG. 4A is a diagram illustrating a temporal variation in the angular velocity signal (a) output from the gyro sensor 100, a temporal variation in the DC component (c) output from the second direct current component detector 302, and a temporal variation in the delay signal (d) output from the time delaying unit 303. FIG. 4B is a diagram illustrating a temporal variation in the calculation result (e) of the second adder 310. FIG. 4C is a diagram for describing an operation for determining the small panning by the small panning determiner 304a. FIG. 4D is a diagram illustrating a temporal variation in the DC component (b) output from the first direct current component detector 301.

When a user holds and pans the camera 1, the gyro sensor 100 outputs the angular velocity signal (a) according to the panning operation. As shown in FIG. 4A, a value of the angular velocity signal (a) increases according to the panning.

Along with to the increase in the value of the angular velocity signal (a) (FIG. 4A), a value of DC component (b) as the detection result of the first direct current component detector 301 (FIG. 4D) and a value of the DC component (c) as the detection result of the second direct current component detector 302 (FIG. 4A) also increase. Similarly, along with the panning, also the delay signal (d) as the output result from the time delaying unit 303 delays from the DC components (b) and (c) and increases (FIG. 4A). Along with the increase in the DC component (c) and the delay signal (d), the calculation result (e) as the absolute value of the difference between the DC component (c) and the delay signal (d) changes (FIG. 4B).

The small panning determiner 304a compares the calculation result (e) as the absolute value of the difference between the DC component (c) and the delay signal (d) with a predetermined threshold R1 during the panning operation by the user, as described above. When the calculation result (e) exceeds the threshold R1, the small panning determiner 304a determines that the small panning starts (time t1 in FIG. 4B).

When determining that the small panning starts, the small panning determiner 304a sets a flag indicating the detection of the small panning to ON (time t1 in FIG. 4C).

When the flag indicating the detection of the small panning is ON, the shake controller 305 clips the signal output from the first direct current component detector 301 to the first adder 309 to a value obtained before the increase in the angular velocity signal (a) according to the small panning. That is to say, the shake controller 305 controls the first direct current component detector 301 so that the reference value of the angular velocity signal (a) in the camera shake correction is set to the value of the DC component (b) stored by the storage unit 301a at, for example, time t0 (time t1 in FIG. 4D). Thereby, the shake processor 300 corrects a camera shake using the value of the DC component (b) obtained before the small panning is carried out on the camera 1 as the reference value of the angular velocity signal (a).

As a result, the shake processor 300 can prevent the integrator 307 from calculating improper integration result due to panning.

Further, at this time, the shake controller 305 makes the cut-off frequency of the integrator 307 and the cut-off frequency of the HPF 308 higher than those which are set during the regular camera shake correction. Thereby, the shake processor 300 can remove the influence of the low frequency components caused by the small panning from the angular velocity signal (a) output by the gyro sensor 100, and thus camera shake can be corrected based on only the high frequency components caused by the camera shake.

When the user holds and gradually pans the camera 1 and then ends the panning, as shown in FIG. 4A, according to the end of the panning, the angular velocity signal abruptly settles to a value at the time when the panning is not carried out (time t2).

At this time, the small panning determiner 304a is comparing the calculation result (e) as the absolute value of the difference between the DC component (c) and the delay signal (d) with a predetermined threshold R2. During the determination of the small panning, when the calculation result (e) becomes smaller than the threshold R2, the small panning determiner 304a determines that the small panning ends (time t2 in FIG. 4B). When determining the end of the small panning, the small panning determiner 304a sets the flag indicating the determination of the small panning to OFF (time t2 in FIG. 4C).

Herein, the threshold R2 to be compared with the calculation result (e) is preset so that the time point when the user ends the panning substantially matches with the time point when the small panning determiner 304a determines the end of the small panning.

By determining the end of the small panning based on the threshold R2 set in such a manner, the small panning determiner 304a can grasp the time point when the small panning operation ends. When determining the end of the small panning, the small panning determiner 304a notifies the shake controller 305 of the end of the small panning.

When notified of the end of the small panning, the shake controller 305 returns the cut-off frequencies of the integrator 307 and the HPF 308 to the values obtained before the start of the small panning. Then, the shake controller 305 controls the second direct current component detector 302 and the time delaying unit 303 so that a value of the DC component (c) of the second direct current component detector 302 and a value of the delay signal (d) of the time delaying unit 303 are the same as the signal value obtained at which the output signal of the first direct current component detector 301 is clipped (namely, a value of the DC component (b) stored by the first direct current component detector 301 at time t0) (a vertical line at time t2 in FIG. 4A).

Then, the shake controller 305 releases the clip on the first direct current component detector 301 to cause the first direct current component detector 301 to restart the regular detection of the DC component. That is to say, the shake controller 305 resets the first direct current component detector 301 so that the shake processor 300 corrects the camera shake using the DC component (b) obtained after the end of the small panning as the reference value. Thereby, the change in the DC component (b) starts to change not from a value shifted due to the panning but the clipped value.

In such a manner, the shake controller 305 controls the respective units when the small panning ends. Thereby, it is possible to avoid a phenomenon that the influence of the small panning remains in the DC component (c) of the second direct current component detector 301 and the delay signal (d) of the time delaying unit 303 even when the small panning ends. Therefore, just after the small panning determination ends, the shake processor 300 can proceed to the regular camera shake correction.

The conventional cameras that do not have the shake processor 300 cannot detect the small panning when the small panning that is lower than the predetermined angular velocity is carried out. Hence, the conventional cameras try to correct camera shake by regular calculation also during the small panning. At this time, however, the DC component (the reference value) of the output from the gyro sensor 100 shifts due to panning, and thus the conventional cameras calculate an improper integration result.

On the other hand, the camera 1 according to the present embodiment can detect the small panning, and can correct the camera shake with the influence of the small panning removed based on the detection result, as described above.

Further, in the conventional cameras, after the small panning operation ends, a value that is not originally the DC component is treated as the DC component for a while. This causes a malfunction.

On the other hand, the camera 1 according to the present embodiment resets the output signals (b), (c) and (d) from the first and second DC component detectors 301 and 302 and the time delaying unit 303 when the small panning ends, as described above. Thereby, just after the end of the small panning, the camera 1 can proceed to the regular camera shake correction.

2-4-3. Operation of Shake Processor during Large Panning

An operation of the shake processor 300 performed when the large panning is carried out on the camera 1 will be described.

The shake processor 300 detects the small panning and the large panning based on an angular velocity of the panning carried out on the camera 1 distinctively from each other. Then, when detecting the large panning, the shake processor 300 performs a control that is different from the control performed when the small panning is detected.

Specifically, the large panning determiner 304b determines the large panning based on the calculation result (e) of the second adder 310. When the calculation result (e) of the second adder 310 is larger than a predetermined threshold R3, the large panning determiner 304b determines that the large panning is carried out in the camera 1. As the threshold R3, a value larger than threshold R1 is preset.

Specifically, while the large panning determiner 304b is determining the large panning, the shake controller 305 controls the respective units of the shake processor 300 so that the camera shake correction is not influenced by the large panning. For example, the shake controller 305 fixes the camera shake signal (f) output from the first adder 309 to zero, or increases the cut-off frequency of the integrator 307 so that the cut-off frequency is noticeably larger than the value set during the detection of the small panning. As a result, a failure or the like of the camera 1 caused by the large panning can be prevented.

When the calculation result (e) of the second adder 310 becomes the predetermined threshold R3 or less, the large panning determiner 304b determines that the large panning ends. Then, the shake controller 305 returns the setting of the first adder 309, the setting of the integrator 307, and so on to the settings set before the determination of the large panning.

Note that the large panning determiner 304b according to the present embodiment is included in the shake controller 305, but the large panning determiner 304b may be separately arranged on another position. For example, the large panning determiner 304b may be arranged between the gyro sensor 100 and the first adder 309. In this case, the large panning determiner 304b compares the angular velocity signal (a) output by the gyro sensor 100 with a predetermined threshold. Then, when the angular velocity signal (a) is larger than the predetermined threshold, the large panning determiner 304b notifies the shake controller 305 of occurrence of the large panning in the camera 1. Further, the large panning determiner 304b may determine the large panning based on, for example, a temporal variation of DC component (b) output from the first direct current component detector 301 or the camera shake signal (f) from output the first adder 309.

Further, while the small panning determiner 304a determines the small panning, when the large panning determiner 304b determines the large panning, the shake controller 305 prioritizes the dedicated control upon determination of the large panning over the dedicated control upon determination of the small panning.

2-5. Conclusion of Present Embodiment

The camera 1 according to the present embodiment is operable to correct a shake occurring on the camera 1. The camera 1 includes a correction lens driver 24a operable to drive a camera shake correction lens 24 configured to correct the shake occurring on the camera 1, a gyro sensor 100 operable to detect an angular velocity of the camera 1, a first direct current component detector 301 operable to detect a direct current component from the angular velocity detected by the gyro sensor 100 to output the DC component, a shake processor 300 operable to control the correction lens driver 24a based on the angular velocity detected by the gyro sensor 100, using an output from the first direct current component detector 301 as a reference value, a shake controller 305 operable to control the first direct current component detector 301 and the shake processor 300 based on the angular velocity detected by the gyro sensor 100, a small panning determiner 304a operable to detect panning of the camera 1 based on the angular velocity detected by the gyro sensor 100, and a storage unit 301a operable to store a value of the DC component output from the first direct current component detector 301 when the small panning determiner 304a does not detect panning. When the small panning determiner 304a changes from a state in which the panning is detected to a state in which the panning is not detected, the shake controller 305 controls the first direct current component detector 301 to output the value of the DC component stored in the storage unit 301a and then controls the first direct current component detector 301 to output the DC component based on the angular velocity detected by the gyro sensor 100.

The camera 1 according to the present embodiment having the above configuration can repress deterioration in the accuracy of the camera shake correction of the camera 1 caused by the panning. More specifically, the camera 1 can start the camera shake correction with the influence of the panning eliminated just after the panning in the camera 1 ends.

Further, while the panning is being determined, the camera 1 according to the present embodiment sets the reference value in the camera shake correction to the reference value obtained before the determination of the panning.

Thereby, the camera 1 according to the present embodiment can correct the camera shake with the influence of the panning eliminated also while the camera 1 is panning.

Further, when determining that the panning ends, the camera 1 according to the present embodiment sets states of the second direct current component detector 302 and the time delaying unit 303 into the states set before the panning starts. Specifically, the DC component (c) output by the second direct current component detector 302 and the delay signal (d) output by the time delaying unit 303 are clipped at the value of the DC component (b) stored before the start of the panning.

Thereby, the camera 1 according to the present embodiment can determine whether the camera 1 is panned just after the end of the panning.

Further, the camera 1 according to the present embodiment includes the gyro sensor 100 operable to detect the angular velocity of the camera 1, the second direct current component detector 302 and the time delaying unit 303 and the second adder 310 operable to calculate a temporal variation in the DC component included in the detected angular velocity, and the small panning determiner 304a operable to determine whether the camera 1 panned based on the temporal variation calculated by the second direct current component detector 302 and the time delaying unit 303 and the second adder 310. The small panning determiner 304a determines that the camera 1 is panned when the calculated temporal variation is larger than the threshold R1 for the small panning determination and is not more than threshold R3 for the large panning determination.

Thereby, the camera 1 can detect the small panning (the panning with the comparatively low speed).

Further, in the camera 1 according to the present embodiment, the second adder 310 calculates the absolute value of the difference between the DC component (c) of the second direct current component detector 302 and the delay signal (d) of the time delaying unit 303. Then, the small panning determiner 304a determines whether the camera 1 is panned based on the calculated absolute value of the difference.

That is to say, the small panning determiner 304a determines the panning based on the DC component (c), and the delay signal (d) delayed from the DC component (c) by the predetermined time Td (FIG. 4A). Thereby, the small panning determiner 304a can determine that the panning continues for a constant period.

3. Other Embodiments

The idea of the above described embodiment is not limited to the embodiment described above. Various embodiments may also be considered. Other embodiments to which the idea of the above described embodiment can be applied will be described below.

The above embodiment describes the case in which the panning operation is performed on the camera 1, but the idea of the above embodiment is not limited to this. That is to say, the idea of the above embodiment can be applied also to a case in which a tilting operation is performed on the camera 1.

Further, in the above embodiment, the temporal variation in the DC component (c) included in the angular velocity signal (a) output by the gyro sensor 100 is calculated by the second direct current component detector 302, the time delaying unit 303, and the second adder 310. However, the idea of the above embodiment is not limited to this. Another means may calculate the temporal variation in the DC component (c) included in the angular velocity signal (a). For example, a differentiating circuit may calculate the temporal variation in the DC component (c) included in the angular velocity signal (a).

Further, in the above embodiment, during the panning determination, the shake controller 305 sets the reference value in the camera shake correction to the value of the DC component (b) stored in the storage unit 301a when the panning is not detected. However, the idea of the above embodiment is not limited to this. The shake controller 305 may control the first direct current component detector 301 during the detection of the panning so that the DC component (b) currently detected by the first direct current component detector 301 is used as the reference value in the camera shake correction. In this case, when the end of the panning is determined, the shake controller 305 once resets the reference value in camera shake correction to the value of the DC component (b) detected by the first direct current component detector 301 before the panning determination. Thereafter, the shake controller 305 controls the first direct current component detector 301 to detect the DC component (b) from the angular velocity signal (a) currently input from the gyro sensor 100. At the time of the end of the panning, even when the first direct current component detector 301 is controlled in such a manner, the regular camera shake correction can be performed just after the end of the panning.

Further, in the above embodiment, the gyro sensor 100 is a digital gyro sensor that outputs a signal in digital form. However, a gyro sensor different in type from the digital gyro sensor may be used. For example, the technical ideas of the present disclosure can be applied to an analog gyro sensor that outputs a signal in analog form.

The embodiments have been described above as examples of the art of the present disclosure. For this purpose, the detailed description and the attached drawings have been disclosed. Therefore, some of the elements described in the detailed description and shown in the attached drawings may be unnecessary to solve the problem. Therefore, the unnecessary element should not be instantly recognized as a necessary element merely because being described in the detailed description and shown in the attached drawings.

Further, the above described embodiments exemplify the art of the present disclosure. Therefore, The above described embodiments can be subject to various changes, substitutions, addition, omission and/or the like without departing from the scope of the claims and the their equivalent.

Industrial Applicability

The idea of the present disclosure can be applied to electronic devices (imaging apparatuses such as digital cameras and camcorders, mobile telephones, and so on) having the camera shake detecting function or the like.

What is claimed is:

1. A shake correcting device operable to correct a shake occurring on a target device, comprising:
   a driver operable to drive a target member configured to correct the shake occurring on the target device;
   an angular velocity detector operable to detect an angular velocity of the target device;
   a DC component detector operable to detect a direct current component from the angular velocity detected by the angular velocity detector to output the DC component;
   a shake corrector operable to control the driver based on the angular velocity detected by the angular velocity detector, using an output from the DC component detector as a reference value;
   a controller operable to control the DC component detector and the shake corrector based on the angular velocity detected by the angular velocity detector;
   a panning detector operable to detect panning of the target device based on the angular velocity detected by the angular velocity detector; and
   a storage unit operable to store a value of the DC component output from the DC component detector when the panning detector does not detect panning, wherein
   when the panning detector changes from a state in which the panning is detected to a state in which the panning is not detected, the controller controls the DC component detector to output the value of the DC component stored in the storage unit and then controls the DC component detector to output the DC component based on the angular velocity detected by the angular velocity detector.

2. The shake correcting device according to claim 1, wherein the controller controls the DC component detector to output the value of the DC component stored in the storage unit while the panning detector is detecting the panning.

3. The shake correcting device according to claim 1, wherein
   the panning detector includes:
      a calculator operable to calculate a temporal variation in the DC component included in the angular velocity detected by the angular velocity detector; and
      a panning determiner operable to determine whether the target device is panned based on the temporal variation calculated by the calculator, and
   the panning determiner determines that the target device is panned when the calculated temporal variation is within a predetermined range.

4. The shake correcting device according to claim 3, wherein
   the calculator includes:
      an other DC component detector operable to detect a DC component from the angular velocity detected by the angular velocity detector;
      a delaying unit operable to delay the DC component detected by the other DC component detector by a predetermined time; and a subtractor operable to calculate an absolute value of a difference between the DC component detected by the other DC component detector and the DC component delayed by the delaying unit.

5. The shake correcting device according to claim 1, wherein the panning detector includes an other DC component detector operable to detect a DC component from the angular velocity detected by the angular velocity detector, when the panning detector changes from the state in which the panning is detected to the state in which the panning is not detected, the controller controls the other DC component detector to output the value of the DC component stored in the storage unit and then controls the other DC component detector to output the DC component based on the angular velocity detected by the angular velocity detector.

6. The shake correcting device according to claim 1, wherein the controller performs the control for the shake corrector in a way which is made different according to the angular velocity of the panning detected by the panning detector.

7. An imaging apparatus, comprising the shake correcting device according to claim 1.

* * * * *